JAMES E. RISSMAN
ARTHUR L. KOHL
INVENTORS

United States Patent Office 2,979,421
Patented Apr. 11, 1961

2,979,421

UREA GRANULATION PROCESS

James E. Rissman and Arthur L. Kohl, Whittier, Calif., assignors to The Fluor Corporation, Ltd., Los Angeles, Calif., a corporation of California Filed Jan. 27, 1958, Ser. No. 711,389

11 Claims. (Cl. 117—100)

This invention relates generally to the production of urea granules, and more particularly is concerned with a method of treating seed size urea particles with an aqueous urea solution so as to increase the size of individual particles and thereby produce product form urea granules having low biuret content. This application is a continuation in part of our now pending application entitled "Urea Granulation Process," Serial No. 652,921, filed April 15, 1957, now abandoned.

The present process is to be distinguished from commercial methods of prilling urea, which involve spraying the molten raw material in towers wherein the sprayed particles are cooled and solidified by streams of air rising countercurrent to the passing product. Because of the high temperatures necessary to melt the urea prior to spraying thereof, such processes are accompanied by the undesirable formation in the solidified urea particles of considerable amounts of biuret, a compound that is toxic to certain plants, restricting the suitability of the prills so formed for use as a fertilizer. Also contained in the urea pellets is the biuret formed during synthesis of urea and during recovery of ammonia from urea synthesis melts.

Fundamentally differing from the present process are those methods of treating finely divided particles with binder liquids or binder solids in an attempt to make groups of particles adhere together or agglomerate so as to build up the particle groups to desired granule size.

The present advance in the art of urea granulation makes possible the economical and continuous formation of commercial fertilizer size urea granules physically resembling urea prills in that the granules are of comparable hardness and of relatively uniform size and shape. One useful advantage possessed by the granules so formed consists in their considerably reduced biuret content in relation to that of the commercial prills, one reason for this being the reduced operating temperature at which granulation is carried out. For example, whereas prilling processes require raising the temperature of urea at least for a short interval prior to a spraying at around 140° C., the present method of urea granulation can be satisfactorily carried out at operating temperatures no higher than 100° C. with a resulting decrease in the rate of biuret formation.

Basically, the present process involves the building up of massed sub-product size urea seed particles, having very low biuret content, to granular product size by wetting the massed seed particles with relatively concentrated urea feed solution, typically produced during urea synthesis, and drying the wetted particles so as to cause a portion of the urea in the wet coating to deposit as a thin layer containing extremely low biuret, with the remaining portion of the wet coating subsequently drying and flaking off as fines. The latter, which contain much higher concentrations of biuret than the deposited urea layer can be considered to be the dried mother liquor remaining after the deposition of the very low biuret urea on the seed particle. The process of building up the seed size particles to specified product dimensions is preferably a continuous one, involving re-circulation of seed size particles to the wetting zone, and in this respect it is important that a minimum of fines be directly re-circulated to the wetting zone since they end to inhibit wetting of the seed particles. Also, build-up of the fines would result in a high biuret product, which it is desirable to avoid.

At least some, and preferably all of the fines separated from the low biuret seed size particles being returned to the wetting zone are removed from the continuous process, although some of the fines may be dissolved in the urea mother solution being passed to the wetting zone as long as the biuret content of the product granules is acceptable. By removing high biuret fines from the first stage of the continuous granulation process, it is possible to produce a first stage product actually lower in biuret than the feed stock. After their separation from the first processing cycle, the fines are processed further in a second urea granulation stage to produce granules having a higher acceptable biuret content, as will be explained.

Other additional steps of the overall process include reducing a side stream of product size granules to sub-product size seed particles to overcome a deficiency in the supply of the latter, compacting the fines to produce additional seed, separating urea agglomerate or oversize lumps from the dried stream and crushing the agglomerate to form product size granules and seed size particles, the latter being return to the wetting zone. For purposes of said separation, the content of the dried particulate urea stream is classified as by screening to separate out side streams of agglomerate, product size granules, seed size particles and fines, all according to the sizing determinations as will appear. Finally, the process includes maintaining the temperature of the stream wetting and drying zones within the range 75 to 120° C. for satisfactory process operation.

Other features and objects of the invention, as well as the details of an illustrative embodiment, will be more fully understood from the following detailed description of the drawings, in which.

Figure 1:
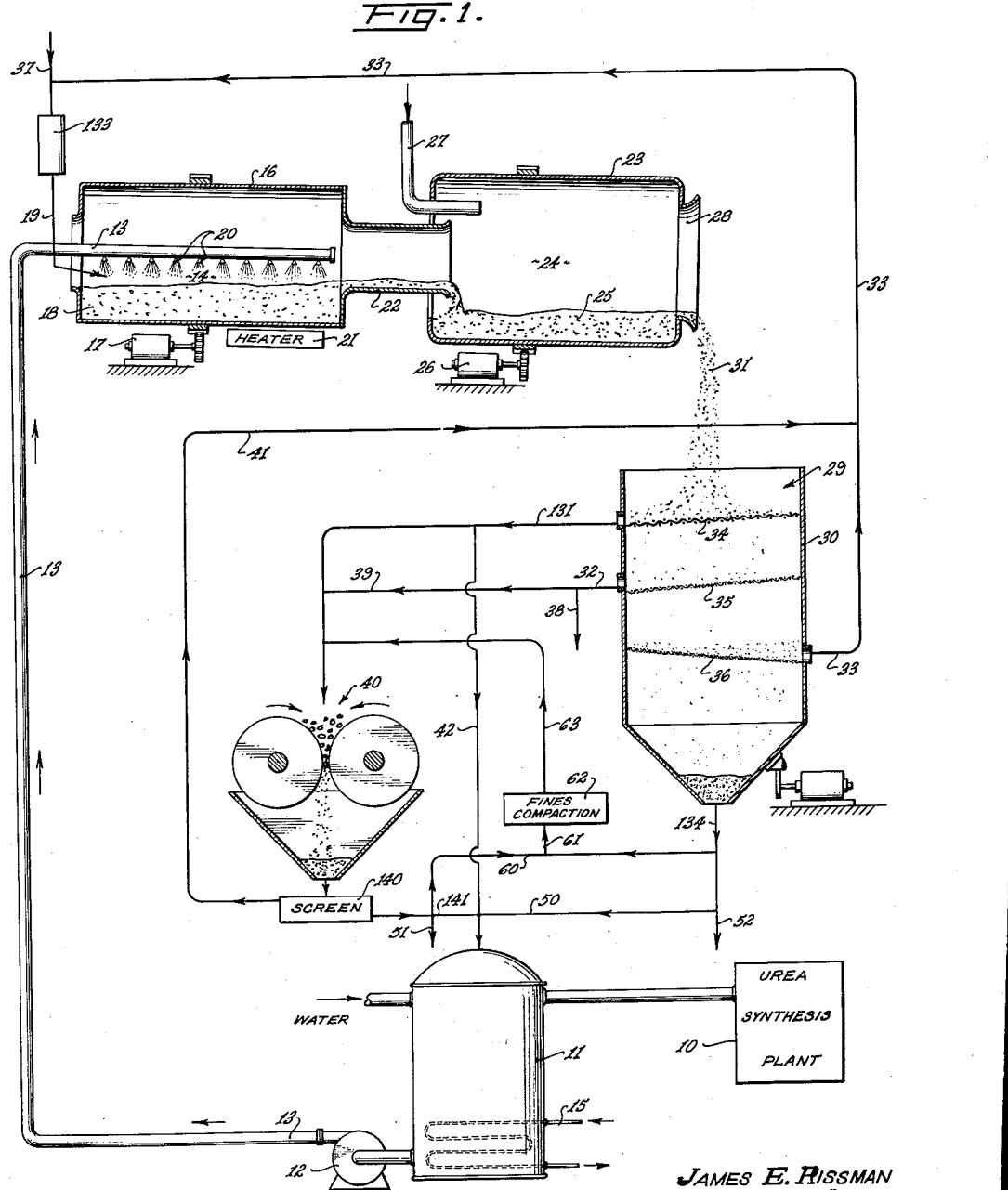
Fig. 1 is a flow diagram illustrating the first stage urea granulation process of the present invention.

Urea is primarily added to the system shown in Fig. 1 in the form of aqueous urea solution typically delivered from a urea synthesis plant indicated at 10, the solution passing into a storage vessel 11 from which it is withdrawn and pumped at 12 through a delivery pipe 13 to the wetting zone indicated generally at 14. To the solution in the vessel 11 is added water for controlling the concentration of the solution within the range 50 to 95 weight percent urea. Also, the aqueous solution temperature is maintained between 60 and 120 degrees centigrade, depending upon the solution concentration, the temperature preferably being above that at which crystallization begins for the particular solution concentration. A typical heater coil 15 extends into the dissolver vessel for controlling the temperature of the solution therein within the above indicated range.

Zone 14 is typically formed by a slightly inclined and axially elongated drum 16, open at both ends, and rotated by a motor 17 so as to agitate or tumble the main stream of urea seed particles indicated at 18 within the drum. The seed particles are supplied at 19 through the inlet end of the drum 16, through which also extends the delivery pipe 13 flowing the concentrated urea solution through nozzles 20 onto and into the tumbling seed bed 18. Other types of commercial mixers may be used, such as those employing moving rakes for securing contact between the dry seed and wet solution.

The temperature of the seed bed in the wetting or coating zone is maintained between 75 and 120 degrees centigrade, for reasons as will be brought out, either by a heater schematically shown at 21 or by other convenient means such as insulation of screens and conveyors. Also, the process is controlled so that the ratio of total water to total urea passing through zone 14 is kept within the range 0.01 to 0.15 for best results. For purposes of agitating the seed bed 18, the drum 16 may or may not be provided with lifting flights, so as to assure complete wetting of all the urea seed particles in the bed 18 prior to leaving zone 14, while at the same time minimizing multi-particle agglomeration such as would otherwise cause a loss of control of resultant particle size, rotation of drum 16 also acting to move the seed particles in a stream toward the outlet end of the drum formed by the reduced diameter neck 22.

Properly wetted seed particles flow in a stream through the drum outlet and the inlet of a second rotating drum 23 into a drying zone indicated generally at 24 where the wet particles collect at 25 and are agitated or tumbled by the rotary movement of the drum 23 driven by motor 26, and the drum may or may not be provided with lifting flights, as described. Such agitation again tends to minimize multi-particle agglomeration, while speeding up drying to reduce the residence time of the seed in drum 23, which is desirably kept at a minimum to prevent excess attrition of the particles. The same is true with respect to tumbling of the seed 18 in drum 16, and it has been found in one instance that satisfactory results are obtained when the seed particles residence time in the wetting zone 14 is kept below five minutes, with a residence time in the drying zone 24 of between 10 and 15 minutes.

During wetting and drying, a thin coating of urea deposits on the seed in crystalline form, building up the seed weight by about five percent, so that those seed particles initially close to product granular size are built up to what are subsequently classified as product granules.

For proper drying, the temperatures of the urea particles moving in zone 24 are desirably kept between 75 and 120 degrees centigrade, as by the flow of hot air or flue gas circulated through pipe 27 into the dryer drum 23 and passing through its outlet 28. The inlet hot air temperature is desirably between 350 and 600 degrees F., and preferably around 500 degrees F., since hotter air permits the use of a smaller drum 23. Such circulation is shown as being concurrent to the flow of the main stream of seed particles in zone 24 but it will be understood that the circulation may be countercurrent thereto. Alternatively, heat may be supplied to the drying zone by heating the drum itself.

Satisfactory build up of the seed particles flowing in the main stream through the wetting and drying zones can occur only under the relatively limited range of separating conditions given above, including temperatures in those zones, the seed solution concentration and the water to urea ratios described. Operation outside these limits can result in the production of excess fines, the balling together or agglomeration of large masses of seed particles, formation of excess biuret, and the production of granules of inferior appearance.

Since the bed temperatures in the two zones are very nearly the same, the two drums 16 and 23 can be combined into a single drum in which the upstream zone is the wetting area and the downstream portion serves as the drying region, with the operating conditions remaining the same as described above. In this event, the wetting and drying zone sizes would be adjusted to bring about the desired relationship between the residence times of the seed particles in the two zones.

Following discharge from the drying zone, the built up particles pass to a separation zone indicated generally at 29 as contained within a vessel 30 receiving the effluent stream 31 from the dryer. At this point, the main stream is subjected to classification of the particles as respects their size, by screens 34, 35 and 36, into a side stream 131 of oversize or agglomerate, a stream 32 of product size granules, a side stream 33 of seed size particles, and a final stream 134 of fines produced in the wetting and drying zones.

For best results considering the economy of the process and the uses to which product size granules are to be put as a commercial fertilizer, the classification of the effluent particle stream 31 is carried out in such a way that all product size granules, whatever their size, will pass a 4 mesh Tyler screen but will not pass a 28 mesh Tyler screen, and so that no seed particles, whatever their size, will pass a 40 mesh Tyler screen. Thus, if both product granules and seed particles are produced and if the particles next below product granules in size are classified as seed particles the size division between product granules and seed particles must be within the range 4 to 28 Tyler screen mesh. The particular classification within that range may be arbitrarily set to maximize the economy of the process in relation to the commercial demand for product granules of determined minimum size.

The upper size limit of 4 mesh Tyler screen imposed on the product granules is the safe maximum from the standpoint of commercial usage of the fertilizer, in that granules larger than 4 mesh begin to enter a range of sizes characterized as producing, upon granular dissolution in the field, an excessive spot concentration of fertilizer chemically harmful to plant life. Also, spreading of the larger granules as by dropping them from aircraft results in a certain amount of physical destruction to plants.

Lowering of the allowable seed size below 40 Tyler screen mesh results in rapidly decreased process efficiency, since the then small seed particles and smaller residual fines present in the seed bed wetting zone tend to adhere, inhibiting urea solution acess to the small seeds and thereby delaying build-up coating of the seed particles in accordance with the process. This effect is marked in the under 40 mesh seed size range.

Finally, the lower size limit of 28 Tyler screen mesh imposed on the product size granules is determined from the consideration that raw seed particles delivered to the wetting zone are normally jagged in outline, and must be converted to smooth granules during build-up in the wetting and drying zones. Those seed particles starting out at 40 mesh size will be sufficiently smooth in outline to qualify as product granules when capable of retention on a 28 mesh screen, from which relation the reason for the minimum product granules size limitation is clearly evident.

Optimum process efficiency has been found to occur when the classifications of particles is carried out with agglomerate being retained on a 6 mesh Tyler screen, with all product size granules passing that screen but being retained on a 12 mesh Tyler screen, with all seed size particles passing the 12 mesh but being retained on a 35 mesh screen, and with fines passing on through the latter.

The side stream of seed size particles from which fines have been removed is re-cycled back to the mixing or wetting zone 14, a sufficient number of new seed particles being added to the side stream at 37 to make up for that which has been withdrawn as product size granules at 38. For purposes of maintaining the bed temperature in zone 14 within the desired limits, the side stream of seed particles may be preheated at 133 prior to their introduction to zone 14. Seed size particles may also be generated by gently cracking a stream portion 39 of the total product granule stream 32 together with the side stream 131 of agglomerate, in a crusher indicated at 40 the discharge of which is separately screened at 140 to remove jagged seed size particles, which are recycled via line 41 back to the wetting zone 14. As indicated by the line 42 some or all of the agglomerate may be introduced to the dissolver vessel 11 to increase the urea solution concentration to the optimum level. It is also contemplated that all or a portion 50 of the fines stream 134 may be returned to the system by forming a suspension or a true solution in the concentrated urea solution feed in vessel 11 with water added as needed. A portion of the stream of fines separated at 140 from the seed particles being returned to the wetting zone may also be passed at 141 to the dissolver vessel 11.

While the side stream 33 of seed size particles recycled to the wetting zone 14 will normally carry some fines that were not separated through screen 36, it is desirable that the fine content of side stream 33 that would pass a 40 mesh Tyler screen be no more than 7% by weight, since more than this percentage unbalances the system as respects improper wetting of the seed particles and resultant lowering of the quality and production of product granules, as well as increased formation of fines in the dryer.

As mentioned in the introduction, all the fines may be removed from the continuous process cycle as indicated at 51 and 52 in Fig. 1, in which case the biuret content of the product granules at 32 is minimized. Under these conditions the extent to which biuret in the feed spray solution will fractionate between fines and product is illustrated in the following two examples wherein the percentages of biuret in the feed solution differ:

| Material Balance | Example 1 | Example 2 |
| --- | --- | --- |
| Urea Solution Rate, lb./hr. (83% urea) | 120 | 120 |
| Seed circulation Rate, lb./hr | 500 | 500 |
| Product Rate, lb./hr | 40 | 42 |
| Fines Rate, lb./hr | 59.7 | 58 |
| Oversize, lb./hr | (¹) | (¹) |

¹ Less than 1.0.

BIURET ANALYSIS

| | | |
| --- | --- | --- |
| Percent biuret in Spray Solution wt. percent | 1.1 | 0.35 |
| Percent biuret in Fines | 1.67 | 0.63 |
| Percent biuret in Product | 0.38 | 0.12 |
| Ratio of Biuret in Fines to Biuret in Product | 4.4 | 5.2 |

OPERATING CONDITIONS

| | | |
| --- | --- | --- |
| Air to Dryer, °F | 500 | 500 |
| Air from Dryer, °F | 200 | 200 |

Biuret distribution between fines and product is approximate in the above examples, since the exact distribution thereof will depend to some extent upon the type of equipment used and operating conditions. It is evident that a great deal of seed is continuously re-cycled to the wetting and drying zones and it is believed that on the average seed particles are re-cycled about 40 to 60 times before being built up to product size granules. This fact illustrates the importance of operating within the above specified limits in order to minimize formation of biuret and production of fines.

Some or all of the fines produced as a result of classifying at 36 and/or 140 may be passed at 60 and 61 to a compaction unit 62, as for example an extrusion press, to produce hard compacted material which is then recycled at 63 to the crusher 40 in Fig. 1. An advantage of incorporating this optional step in the process consists in a reduction of the amount of water addition needed for dissolving fines in tank 11, which water must be evaporated in drying zone 24. Also, the amount of fines circulation in the feed solution to the wetting and drying zones would be reduced.

Figure 2:
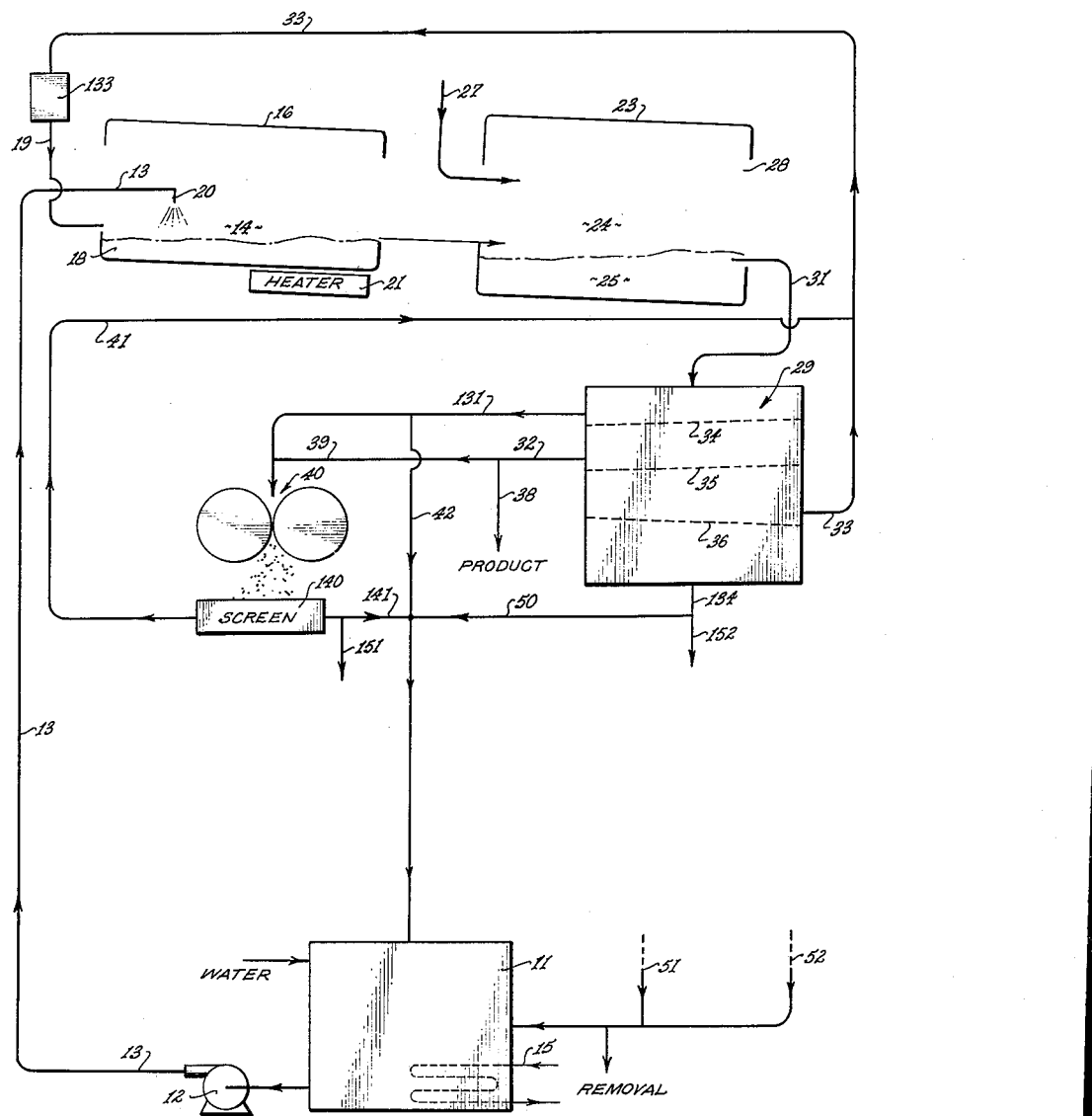
Fig. 2 is another flow diagram illustrative of the second granulation stage productive of a higher biuret product.

Operation of the process combining the granulation cycle of Fig. 1, wherein at least some of the fines are removed at 51 and 52, and a second granulation step involving further treatment of the removed fines is illustrated in Fig. 2. As shown therein, the fine streams 51 and 52 from the first granulation step are passed to the dissolver vessel 11 to which sufficient water is added to control the concentration of the urea solution formed therein within the range 50 to 95 weight percent urea, as before. Solution pumped from that vessel is processed as schematically shown in Fig. 2 in the same manner as earlier described in connection with Fig. 1, operating conditions remaining the same; however, since biuret tends to concentrate in the fines, the biuret content of the product granules at 23 in the second granulation step will be considerably higher than the biuret content of the granules at 32 in Fig. 1.

An example illustrative of a combined two-step granulation process is given below:

*First granulation step with all fines passed to second granulation step*

| | Material Balance Rate, lb./hr. | Percent Biuret based on urea |
| --- | --- | --- |
| Urea Feed Solution (83% aqueous soln.) | 120 | 0.7 |
| Seed Circulation | 500 | 0.25 |
| Low Biuret Granulation Product | 40 | 0.25 |
| Fines going to second granulation step | 60 | 1.3 |
| Oversize | (¹) | |

¹ Less than 1.0.

*Second granulation step with urea feed solution comprising an aqueous solution made by dissolving in water the fines from the first and second granulation steps*

| | Rate, lb./hr. | Percent Biuret based on urea |
| --- | --- | --- |
| Urea Feed Solution (an 83% aqueous soln.) | 181 | |
| Seed Circulation | 760 | |
| High Biuret Granulation Product | 60 | 1.4 |
| Fines recycled in second granulation step | 90 | |

In the second granulation step shown in Fig. 2, some or all fines produced as a result of classifying at 36 and 140 may be returned to the dissolver 11, and some or all of these fines may be removed as 151 and 152 so as to limit the amount of urea recirculation in the continuous process and reduce the amount of water needed in the dissolver and therefore reduce the load on the dryer.

Figure 3:
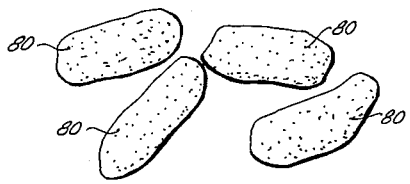
Fig. 3 shows typical shapes of urea product granular produced by the present process.

The granulation process as described in connection with Figs. 1 and 2 produces elongated product granules that are different in appearance and in structure from materials produced by conventional granulation processes. Typical 10 to 16 mesh product granules are shown greatly enlarged in Fig. 3 and as having the appearance of smooth rice shaped particles. Each granule consists of a single small jagged core and a jacket having a crystal structure oriented parallel to the major axis of the granule. This jacket crystal structure differs markedly from the crystal structure of prilled materials including urea that radiates outwardly from the center of the prill as do the spokes of a wheel, and of agglomerated materials wherein the crystal structure is random and numerous jagged particles are bonded together to form a granule, the product granules are identified at 80 in Fig. 3.

We claim:

1. The process of building up sub-product size urea seed particles to granular product size so that the product granules have lower biuret concentration than a urea feed solution from which said seed particles are derived, that includes passing a stream of said seed size particles through wetting and drying zones and therein wetting the particles with an aqueous urea feed solution and drying the wetted particles to deposit thin coatings of urea thereon and at temperatures sufficiently below urea melting temperature that substantially no additional biuret forms, agitating said stream in said zones to inhibit coated particle agglomeration and to flake off as fines the outermost deposited coatings in which biuret concentrates, separating contents of the resultant stream into product granules, seed particles and fines smaller than said seed and product, said seed particles being larger than 40 mesh Tyler scale, returning a side stream of said separated seed particles to said wetting zone, said steps being carried out so that the seed particles being returned to the wetting zone remain discrete and unmelted between and during said return and passage thereof through said wetting and drying zones, said fines and seed particles separation being sufficiently complete that fines smaller than 40 mesh Tyler scale in the seed particle stream being returned to said wetting zone comprise less than 8% of the side stream weight, and permanently removing from said process streams the bulk of the separated fines which are not returned to the wetting zone in said seed particle stream.

2. The process of building up sub-product size urea seed particles to granular product size so that the product granules have lower biuret concentration than a urea feed solution from which said seed particles are derived, that includes passing a stream of said seed size particles through wetting and drying zones and therein wetting the particles with an aqueous urea feed solution and drying the wetted particles to deposit thin coatings of urea thereon and at temperatures sufficiently below urea melting temperature that substantially no additional biuret forms, agitating said stream in said zones to inhibit coated particle agglomeration and to flake off as fines the outermost deposited coatings in which biuret concentrates, separating contents of the resultant stream into product granules, seed particles and fines smaller than said seed and product, said product granules being smaller than 4 mesh Tyler scale and said seed particles being larger than 40 mesh Tyler scale, returning a side stream of said separated seed particles to said wetting zone, said steps being carried out so that the seed particles being returned to the wetting zone remain discrete and unmelted between and during said return and passage thereof through said wetting and drying zones, said fines and seed particle separation being sufficiently complete that unseparated fines smaller than 40 mesh Tyler scale in the seed particle stream being returned to said wetting zone comprise less than 8% of the stream weight, and permanently removing from said process streams the bulk of the separated fines which are not returned to the wetting zone in said seed particle stream.

3. The method of claim 2 including maintaining the temperature of the particle stream in both said wetting and drying zones between 75 and 120 degrees centigrade.

4. The method of claim 2 in which the product granules are larger than 28 mesh Tyler scale.

5. The method of claim 2 including dissolving at least some of said fines in said feed solution.

6. The method as defined in claim 2 in which said solution concentration is maintained between 50 and 95 weight percent and in which said solution temperature is maintained between 60 and 130 degrees centigade.

7. The method as defined in claim 2 in which the weight ratio of water to urea in said wetting zone is between .01 and .15.

8. The method of claim 2 including separating agglomerate larger than 40 mesh Tyler scale from said resultant stream contents, reducing the size of some of said agglomerate in another side stream, separating said other side stream into seed size particles and fines and then returning said separated seed particles to said wetting zone, said seed particles being larger than 40 mesh Tyler scale, said fines and seed particle separation being sufficiently complete that unseparated fines smaller than 40 mesh Tyler scale in the seed particle stream being returned to said wetting zone comprise less than 8% of the stream weight.

9. The method of claim 2 including processing a portion of said fines to form additional seed size particles and introducing said additional seed particles to said wetting zone.

10. The process of claim 2 including independently processing a second stream of seed particles according to the process of claim 2, forming an aqueous solution of said separated fines, and using said aqueous fines solution to wet the seed particles being independently processsed.

11. The continuous process of building up sub-product size urea seed particles to granular product size so that the product granules have lower biuret concentration than a urea feed solution from which the seed particles are derived, that includes passing a stream of said seed size particles in sequence through wetting and drying zones and therein first wetting the seed particles with an aqueous urea feed solution containing between 50 and 95 weight percent urea and then drying the wetted particles to deposit thin coatings of urea therein, maintaining the temperatures of the particle stream in said zones between 75 and 120 degrees centigrade, tumbling the stream in each of said zones to inhibit coated particle agglomeration and to flake off as fines the outermost deposited coatings in which biuret concentrates, separating the contents of the resultant stream into agglomerated urea, product size granules, seed size particles and fines in such size relation that the product granules are smaller than the agglomerate and larger than the seed and the seed particles are larger than the fines with the product granules being smaller than 4 mesh Tyler scale and the seed particles larger than 40 mesh Tyler scale, returning a side stream of said seed size particles to said wetting zone, said steps being carried out so that the seed particles being returned to the wetting zone remain discrete and unmelted between and during said return and passage thereof through said wetting and drying zones, said fines and seed particle separation being sufficiently complete that unseparated fines in the seed particle stream being returned to said wetting zone comprise less than 8% of the stream weight, and permanently removing from said process streams the bulk of the separated fines which are not returned to the wetting zone in said seed particle stream.

References Cited in the file of this patent

UNITED STATES PATENTS

| | | |
|---|---|---|
| Re. 19,750 | Billings et al. | Nov. 12, 1935 |
| 2,436,766 | Davis | Feb. 24, 1949 |
| 2,436,771 | Hood | Feb. 24, 1948 |
| 2,618,546 | Davenport | Nov. 18, 1952 |
| 2,663,731 | Michelitsch | Dec. 22, 1953 |
| 2,810,710 | Long | Oct. 22, 1957 |
| 2,815,376 | Knowlton et al. | Dec. 3, 1957 |
| 2,919,184 | Osswald et al. | Dec. 29, 1959 |